(12) United States Patent
Brahmavar

(10) Patent No.: US 8,896,250 B2
(45) Date of Patent: Nov. 25, 2014

(54) METHODS TO AVOID A SINGLE POINT OF FAILURE

(71) Applicant: General Electric Company, Schenectady, NY (US)

(72) Inventor: Ramesh Pai Brahmavar, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 13/659,553

(22) Filed: Oct. 24, 2012

(65) Prior Publication Data

US 2014/0111889 A1    Apr. 24, 2014

(51) Int. Cl.
*H02P 1/04* (2006.01)
*H02H 3/38* (2006.01)

(52) U.S. Cl.
CPC ..................................... *H02H 3/38* (2013.01)
USPC ................ 318/444; 318/34; 318/255; 361/30

(58) Field of Classification Search
CPC .................................. H02H 3/38; H02H 7/04
USPC ............................... 318/444, 34, 255; 361/30
See application file for complete search history.

(56) References Cited

U.S. PATENT DOCUMENTS

| | | | |
|---|---|---|---|
| 4,331,952 A | 5/1982 | Galvin et al. | |
| 4,536,686 A | 8/1985 | Gartner | |
| 5,774,736 A | 6/1998 | Wright et al. | |
| 5,845,738 A | 12/1998 | Nishino et al. | |
| 6,683,432 B2 | 1/2004 | Griffis | |
| 6,700,351 B2 | 3/2004 | Blair et al. | |
| 6,829,124 B2 | 12/2004 | Leopold et al. | |
| 6,850,396 B1 | 2/2005 | Clemo et al. | |
| 6,927,599 B2 | 8/2005 | Ju et al. | |
| 6,979,987 B2 | 12/2005 | Kernahan et al. | |
| 7,139,196 B2 | 11/2006 | Tran | |
| 7,453,235 B2 | 11/2008 | Blair et al. | |
| 7,459,864 B2 | 12/2008 | Lys | |
| 7,521,884 B2 * | 4/2009 | Filippenko | 318/400.06 |
| 2005/0218870 A1 | 10/2005 | Lys | |
| 2007/0040657 A1 | 2/2007 | Fosler et al. | |

FOREIGN PATENT DOCUMENTS

EP      1183771 B1     5/2003

OTHER PUBLICATIONS

U.S. Appl. No. 13/107,253, filed May 13, 2011.

* cited by examiner

*Primary Examiner* — Bentsu Ro
*Assistant Examiner* — David Luo
(74) *Attorney, Agent, or Firm* — Cantor Colburn LLP

(57) ABSTRACT

A method to avoid a single point of failure in a system that includes at least two monitoring devices, at least two power supplies and a switching device coupled between the monitoring devices and the power supplies. The method includes performing a test that can determine if two monitoring devices are receiving power from the power supply, generating an error code and varying a position of one or more switches in a switching device based on the error code.

13 Claims, 4 Drawing Sheets

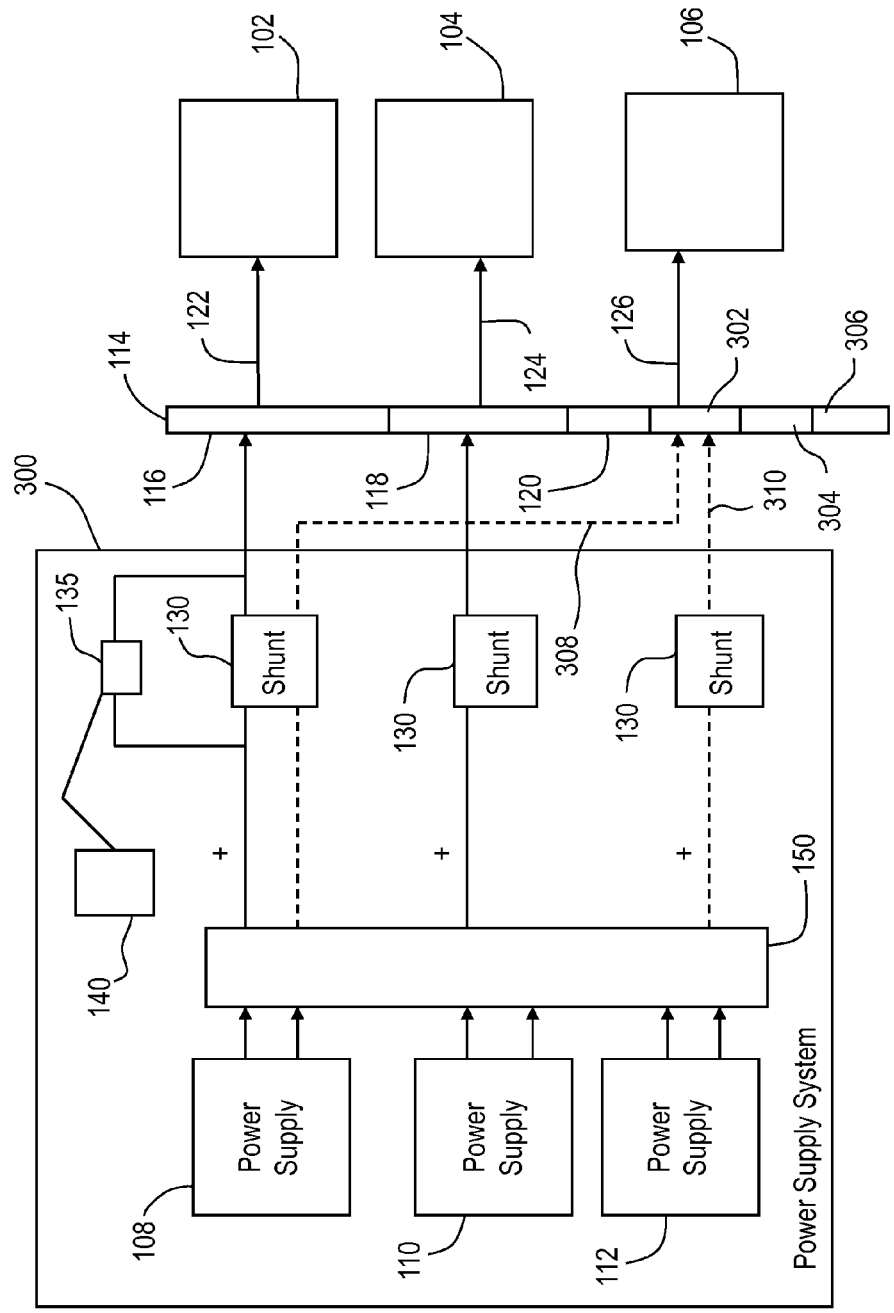

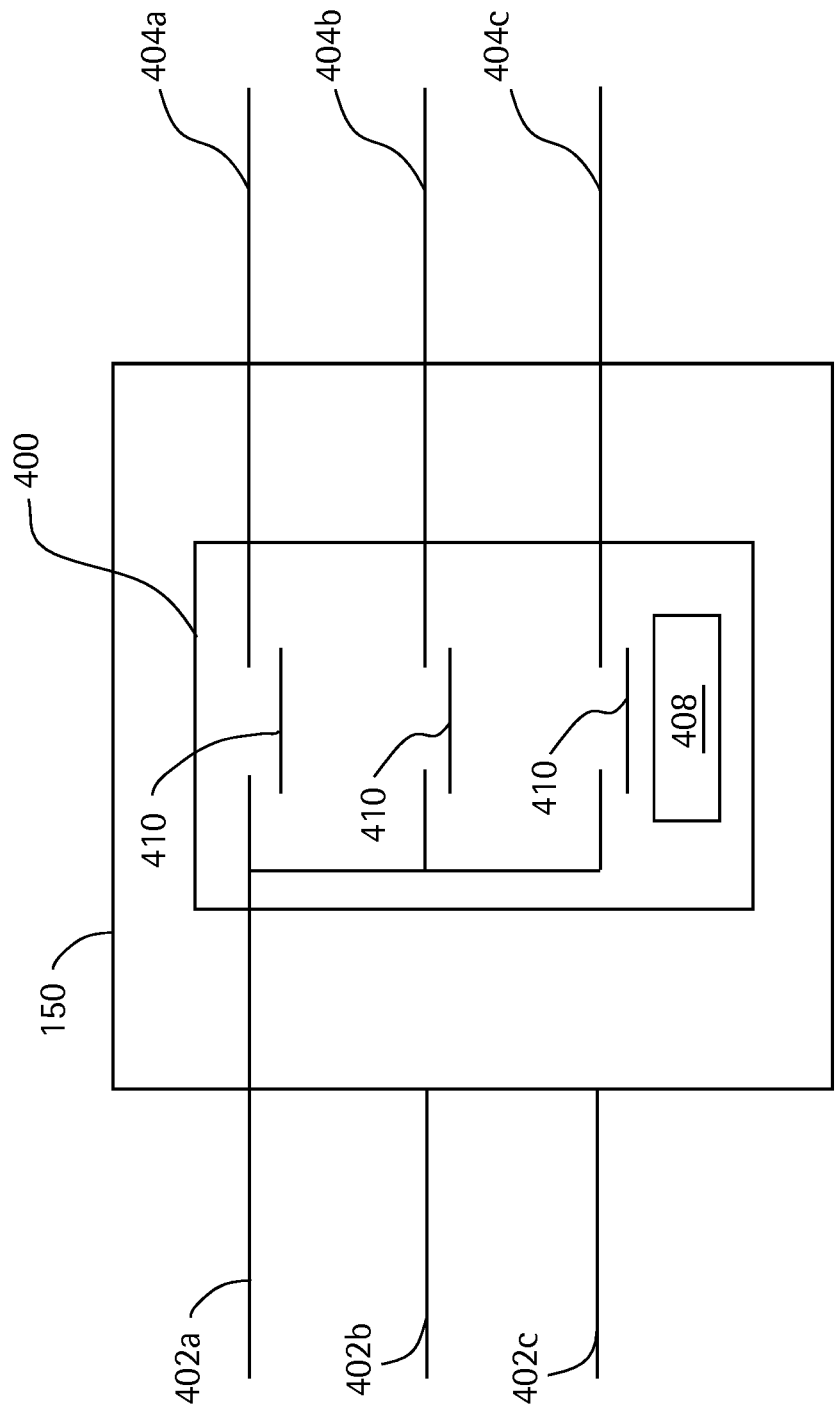

METHODS TO AVOID A SINGLE POINT OF FAILURE

BACKGROUND OF THE INVENTION

The subject matter disclosed herein relates to failure prevention and, in particular, systems and methods to avoid single point failures.

Gas turbines, used in the generation of power, draw in air from the atmosphere and a fuel as inputs. The fuel can be gas, liquid or a combination of gas/liquid fuel. The fuel and air are combined and combusted to provide the driving force causing the turbine's rotor to rotate. As is known in the art, the power generated from gas turbines can be controlled by controlling a rate at which the fuel and air are provided to the turbine.

Inlet air from the atmosphere passes through an inlet guide vane (IGV) and then enters a compressor. Inlet airflow rate can be adjusted by changing a vane angle of the IGV. Fuel flow is controlled by a set of flow control and pressure control valves. The flow control and pressure control valve position can be measured by two or more variable differential transformers (VDTs) per valve depending on configuration. In general, the VDT's are used to measure the position of the valve. The VDT's can be either linear VDTs (LVDTs) or rotary VDTs (RVDTs) VDT's, in general, include an excitation (primary) coil and one or more output coils. In some cases, when the configuration uses two VDTs, the highest value is considered in control and protection algorithms. In cases where three VDT's are used to monitor the position of a single valve (i.e., a triple modular redundant (TMR) system) it is common to use a median value of the three reported positions in control and protection algorithms.

In order to operate the turbine in a desired manner, the user specifies a power output level. From this level, control algorithms determine the fuel and air required to meet the output level. The fuel and air requirements can be converted to valve and IGV positions and the positions are monitored by the VDTs. Of course, the valve and IGV positions can be changed to more closely tune the turbine to a desired power output.

BRIEF DESCRIPTION OF THE INVENTION

According to one aspect method to avoid a single point of failure in a system that includes at least two monitoring devices, at least two power supplies and a switching device coupled between the at least two monitoring devices and the at least two power supplies is disclosed. The method includes performing a test comprising: placing a portion of a machine being monitored by the at least two monitoring devices in a first position; causing the portion to cycle to a second position during a first cycle; measuring a component of electrical power provided by a first power supply of the at least two power supplies while the portion cycles during the first cycle; returning the portion to the first position; causing the portion to cycle to the second position during a second cycle; and measuring a component of electrical power provided by a second power supply of the at least two power supplies during the second cycle. The method also includes: determining whether an amount of the component of electrical power provided by the first power supply during the first cycle or the component of electrical power provided by the second power supply during the second cycle is equal to or less than a minimum value; generating an error code when at least one of the component of electrical power provided by the first power supply during the first cycle and the component of electrical power provided by the second power supply during the second cycle the is equal to or less than a minimum value; and varying a position of one or more switches in the switching device based on the error code.

According to another aspect, a method of correcting a single point of failure that includes: placing a portion of a machine being monitored by a plurality of monitoring devices in a first position; causing the portion to cycle to a second position during a first cycle; measuring a component of electrical power provided by a first power supply unit while the portion cycles during the first cycle; determining that an amount of the component of electrical power provided by the first power supply unit during the first cycle exceeds a threshold; generating an error code that indicates that more than one monitoring device is coupled to the first power supply; and varying a configuration of a switching device coupled between first and second power supplies and the portion is disclosed.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a power supply system according to another embodiment; and

FIG. 4 is switch box according to one embodiment.

The detailed description explains embodiments of the invention, together with advantages and features, by way of example with reference to the drawings.

DETAILED DESCRIPTION OF THE INVENTION

As discussed above, the IGV and valves in a turbine can include two or more monitoring devices (e.g., VDT's) used to monitor their operational positions. It has been discovered that when two or more of the monitoring devices receive power from a single power source, that power source can represent a single point of failure capable of disabling all of the monitoring devices to which it is coupled. It is a technical effect of one embodiment that a determination of whether such a single point of failure exists can be made and that the single point of failure can be automatically removed.

To further illustrate the problem, assume that all of the VDT's monitoring the position of a flow control valve receive power from a single power supply. If this power supply fails, all of the VDT's fail and a trip occurs. Such trips can be costly and should be avoided. One approach to avoid such a single point of failure is to power each VDT from a different power source. However, human wiring errors can still occur. Embodiments disclosed herein can detect and correct such errors. In particular, a switching element can be provided that, upon determination of single point of error, can vary connections between power supplies and monitoring devices (e.g., VDT's) to remove the error. While the description herein focuses on VDT's used in turbines, it shall be understood that the teachings are applicable to any situation where two or more sensors are monitoring a parameter of a machine.

Figure 1:
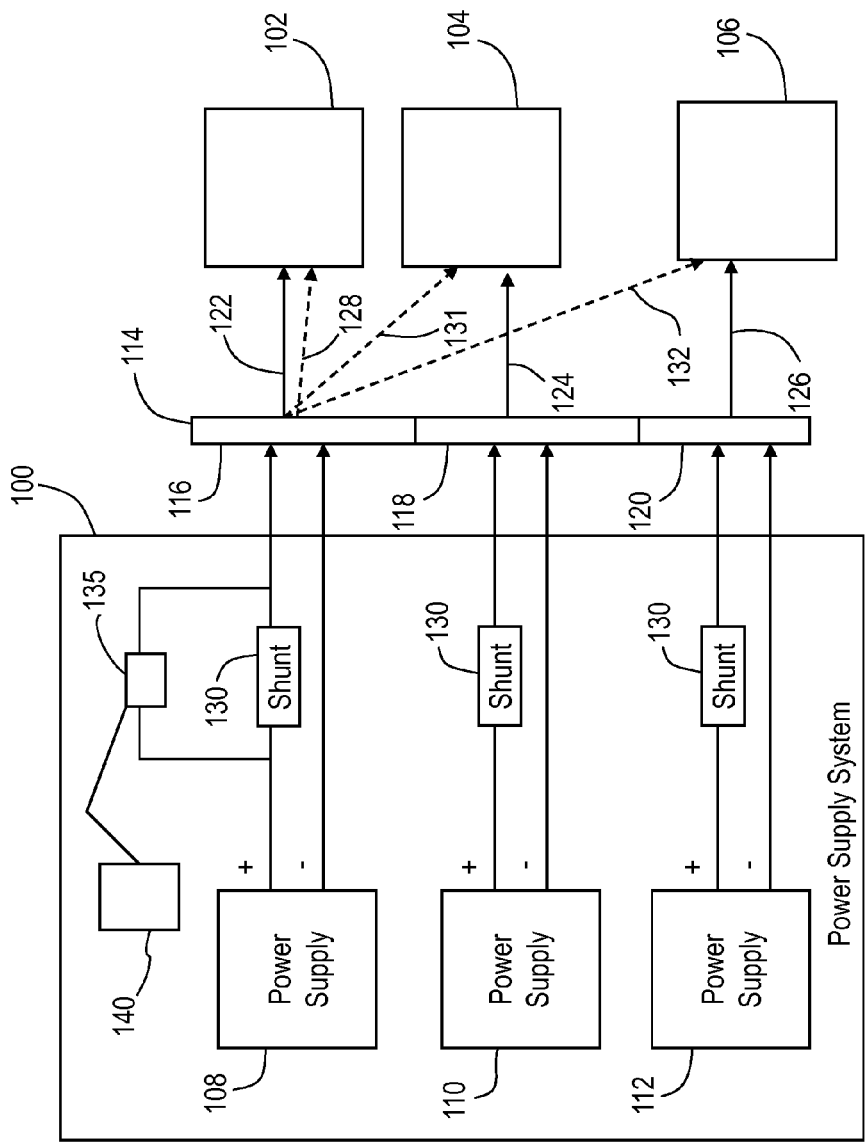
FIG. 1 is a power supply system according to one embodiment.

By way of explanation, FIG. 1 illustrates a power supply system 100 that supplies power to devices 102, 104, 106. The power supply system 100 could supply power to any number of devices greater than two and the three devices 102, 104, 106 shown in FIG. 1 are merely illustrative. The devices 102, 104, 106 can be sensors or other types of devices. In one embodiment, the devices 102, 104, 106 are position sensors that are implemented as either LVDTs or RDVTs.

The power supply system 100 includes two or more power supply units illustrated as first power supply unit 108, second power supply unit 110, and third power supply unit 112. The power supply units 108, 110, 112 are each capable of powering one or more of the devices 102, 104, 106. According to one embodiment, the power supply system 100 includes only the first and second power supply units 108, 110. In another embodiment, the power supply system 100 includes more than the three power supply units illustrated in FIG. 1. The power supply units 108, 110, 112 can be selected to provide either direct current (DC) or alternating current (AC) power depending on the requirements of the devices 102, 104, 106.

As illustrated, the system 100 also includes an optional terminal block 114 that serves as a convenient connection location for both the power supply units 108, 110, 112 and the devices 102, 104, 106. In FIG. 1, the terminal block 114 is shown as including three terminal block sections 116, 118 and 120. Each of the power supply units 108, 110, 112 is connected to a different one of the terminal block sections 116, 118, 120, respectively.

In operation, and as described above, it is desirable to configure the system 100 such that each power supply unit 108, 110, 112 powers a different one of the devices 102, 104, 106. When so configured, the failure of one of the power supply units 108, 110, 112 will not cause the failure of devices not connected to it.

Connections 122, 124 and 126, respectively, connect the first terminal block section 116 to the first device 102, the second terminal block section 118 to the second device 104, and the third terminal block section 120 to the third device 106. When the system 100 is connected utilizing connections 122, 124, 126, each device 102, 104, 106 is receiving power from a different one of the power supply units 108, 110, 112, respectively. As such, there is not a single point of failure for all of the devices 102, 104, 106.

Conversely, when two or more of the devices 102, 104, 106 are coupled to a single power supply unit, that power supply unit is a single point of failure for all of the devices to which it is connected. Such a configuration is shown by dotted line connections 128, 131, 132 which illustrate an alternative configuration of the system 100. In such a configuration, of course, connections 122, 124 and 126 are not present.

The power supply system 100 also includes shunts 130 coupled between the power supply units 108, 110, 112 and the devices 102, 104, 106 they supply power to. One or more of these shunts 130 can include a meter 135 that measures a voltage (or other power component) across the shunt 130. This voltage can be used by a tester 140 to determine if more than one device 102, 104, 106 is coupled to and drawing power from the power supply unit to which the particular shunt 130 is attached. Any or all of the shunts 130 can be coupled to the tester 140. At will be understood, the tester 140 can include logic or other programming to determine if currents/or voltages measured by the meter 135 exceed or do not meet certain thresholds. Based on this logic, a determination that a single point of failure exists can be determined. It shall be understood that, in one embodiment, the tester 140 generates error codes or other indications that inform either a user or other components of the systems disclosed herein that an error in wiring (e.g., a single point of failure) may exist.

Figure 2:
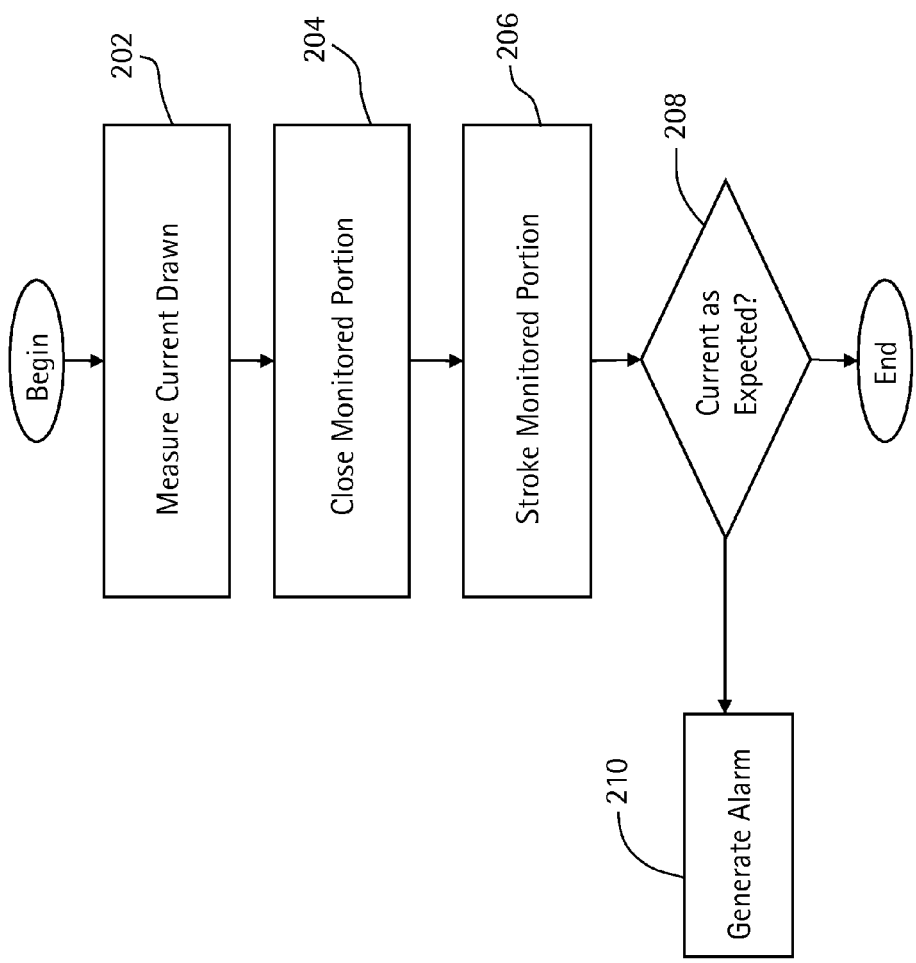
FIG. 2 is a flow chart illustrating a method of avoid single point failures according to one embodiment.

FIG. 2 is a block diagram showing a method for determining if more than one (or a desired number) of devices are drawing power from a single power supply unit. In this example it shall be assumed that the devices are VDTs used to measure the position of a flow control or pressure control valve in a turbine. Of course, the method could be applied to any system when two or more sensors are measuring an operational parameter of a machine. For example, the sensors could be measuring the position of an IGV.

At block 202 the current being drawn from each power supply unit is measured. The measurement can be continuous or discrete. If discrete, the measurement can be made periodically in one embodiment.

At block 204, the valve is/are all closed. Then, at block 206, the valve is cycled from its fully closed position to its fully open position (i.e., stroked) as the current drawn through the VDTs is monitored. In one embodiment, the current drawn from each power supply unit is measured at the same time. In another embodiment, the process of block 204 and 206 are repeated and, during each repetition, the current drawn by a different one of the power supply units is monitored. For example, and referring again to FIG. 1, if three power supply units 108, 110, 112 are providing power, during a first stroking of the valve, the current drawn from the first power supply unit 108 is measured, during a second stroking of the valve, the current drawn from the second power supply unit 110 is measured, and during a third stroking of the valve, the current drawn from the third power supply unit 112 is measured.

Regardless of when the currents are measured, at block 208 it is determined if the current drawn changed for all of the power supply units as the valve was stroked. If so, the connection of the devices is correct and the process ends.

In contrast, if the current drawn is less than or equal to a minimum value during any of the cycles, this indicates that one of the power supply units is not providing power to any of the devices 102, 104, 106 (FIG. 1). Of course, the minimum value could be zero in one embodiment. In another embodiment, the minimum value is the value that a particular device draws when in an idle state. In the even that the current drawn does not exceed the minimum, an alarm is generated indicating a connection error at block 210. This alarm could be an actual alarm or an error code or both. As an example, if during one of the stroking cycles one of the power supply units had no power drawn from it, it can be concluded that two of the VDT's are drawing power from a single one of the power supply units. Of course, other algorithms could be utilized to determine if the two or more VDT's are drawing power from a single power supply unit. For example, if the current drawn from one of the power supply units when one of the valves is stroked exceeds a threshold that is equal the maximum current that can be drawn by a single VDT, it can be concluded that two or more VDT's are drawing power from the power supply unit. In either case, the tester 140 could generate, for example, an error code or other message. As shown below, embodiments herein allow for automatic wiring connection changes. Such changes may occur when the error code is produced. In such a case, the method shown in FIG. 2 can be repeated with the new connections until the error is resolved.

FIG. 3 illustrates an alternative embodiment of a power supply system 300 that may automatically correct for single point of failure. This embodiment includes a switching element 150 disposed between the power supply units 108, 110, 112 and the terminal block 114. The switching element 150 can be used to select the power supply unit that provides power to a particular terminal block section. The configuration shown in FIG. 3 has device 106 coupled via connection 126 to terminal block section 302 rather than terminal block section 120.

In FIG. 3, one or more of the power supply units 108, 110, 112 can include the capability of providing output to two different devices 102, 104, 106. As illustrated, power supply unit 108 is providing power to both terminal block section 116 and terminal block section 302. As such, both devices 102 and 106 are connected to power supply 108. Accordingly, the second connection 308 is incorrect and is shown as a dashed line. Performing the testing described above will indicate that power supply unit 112 is not providing power and that power supply unit 108 is providing power to two devices. This situation can be rectified, my varying the switch configuration in the switch element 150 to couple power supply 112 to terminal block 302 as shown by dashed connection 310. This embodiment can be useful because it allows for switching power supply-to-device connections without requiring changing the wiring between the terminal block 114 and the devices 102, 104, 106. In one embodiment, the connections in the switching device 150 are changed when the error code described above is received. The connections, in one embodiment, are controlled by firmware in the switching device 150 and, as such, switching can occur automatically.

FIG. 4 shows a more detailed depiction of an example of a switch device 150. The switch device 150 includes inputs 402a-402c and a corresponding number of outputs 404a-404c. The switch device 150 illustrated in FIG. 4 also includes a switch control section 400. As illustrated, only a single switch control section 400 is shown but it shall be understood that each input 402a-402c could have is own associated switch control section 400. The switch control section 400 may include logic 408 that can cause the different switches 410 to open or close to change which of the outputs 404a-404c input 402a is electrically connected to. The exact operation of the logic 408 can be determined based on the number of inputs/outputs but should include a limitation that each input is only connected to one output and two inputs are not to be connected to the same output. In one embodiment, the switches 410 may be bypassed by a jumper is the logic 408 cannot create a configuration of switches 410 that meets the criteria expressed above and also is in accordance with the method/test described above with respect to FIG. 3.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method to avoid a single point of failure in a system that includes at least two monitoring devices, at least two power supplies and a switching device coupled between the at least two monitoring devices and the at least two power supplies, the method comprising:
    performing a test comprising:
        placing a portion of a machine being monitored by the at least two monitoring devices in a first position;
        causing the portion to cycle to a second position during a first cycle;
        measuring a component of electrical power provided by a first power supply of the at least two power supplies while the portion cycles during the first cycle;
        returning the portion to the first position;
        causing the portion to cycle to the second position during a second cycle; and
        measuring a component of electrical power provided by a second power supply of the at least two power supplies during the second cycle;
    determining whether an amount of the component of electrical power provided by the first power supply during the first cycle or the component of electrical power provided by the second power supply during the second cycle is equal to or less than a minimum value;
    generating an error code when at least one of the component of electrical power provided by the first power supply during the first cycle and the component of electrical power provided by the second power supply during the second cycle the is equal to or less than a minimum value; and
    varying a position of one or more switches in the switching device based on the error code.

2. The method of claim 1, wherein the machine being monitored is a turbine.

3. The method of claim 2, wherein the at least two monitoring devices are linear variable differential transformers or rotary variable differential transformers.

4. The method of claim 2, wherein the portion is a flow control or pressure control valve, the first position is a fully closed position and the second position is a fully open position.

5. The method of claim 1, further comprising:
    returning the portion to the first position after the second cycle;
    causing the portion to cycle to the second position during a third cycle; and
    measuring a component of electrical power provided by a third power supply during the third cycle;
    wherein determining includes determining whether an amount of the component of electrical power provided by the third power supply during the third cycle is equal to or less than the minimum value.

6. The method of claim 1, wherein the component of electrical power provided by first power supply is one of current or voltage.

7. The method of claim 1, further comprising:
    performing the test, determining and varying until the amount of the component of electrical power provided during either the first or second cycle is not equal to or less than the minimum value.

8. A method of correcting a single point of failure comprising:
    placing a portion of a machine being monitored by a plurality of monitoring devices in a first position;
    causing the portion to cycle to a second position during a first cycle;
    measuring a component of electrical power provided by a first power supply unit while the portion cycles during the first cycle;
    determining that an amount of the component of electrical power provided by the first power supply unit during the first cycle exceeds a threshold;
    generating an error code that indicates that more than one monitoring device is coupled to the first power supply; and
    varying a configuration of a switching device coupled between first and second power supplies and the portion.

9. The method of claim 8, wherein varying includes changing an output of the switching device to which at least one input to the switching device is connected.

10. The method of claim 8, wherein the machine being monitored is a turbine.

11. The method of claim 8, wherein the plurality of monitoring devices are selected from: linear variable differential transformers (LVDTs) and rotary variable differential transformers.

12. The method of claim 8, wherein the portion is a flow control valve, the first position is a fully closed position and the second position is a fully open position.

13. The method of claim 8, wherein the component is current or voltage.

* * * * *

UNITED STATES PATENT AND TRADEMARK OFFICE
CERTIFICATE OF CORRECTION

| | | |
|---|---|---|
| PATENT NO. | : 8,896,250 B2 | Page 1 of 1 |
| APPLICATION NO. | : 13/659553 | |
| DATED | : November 25, 2014 | |
| INVENTOR(S) | : Brahmavar | |

It is certified that error appears in the above-identified patent and that said Letters Patent is hereby corrected as shown below:

In the Specification

In Column 4, Line 41, delete "the even" and insert -- the event --, therefor.

In Column 5, Line 31, delete "have is" and insert -- have its --, therefor.

In the Claims

In Column 6, Line 19, in Claim 1, delete "cycle the is" and insert -- cycle is --, therefor.

Signed and Sealed this
Twenty-third Day of February, 2016

Michelle K. Lee
*Director of the United States Patent and Trademark Office*